Sept. 7, 1948. G. A. LYON 2,448,536
WHEEL COVER
Filed May 12, 1945

Inventor
GEORGE ALBERT LYON
by The Firm of Charles W. Hills Attys.

Patented Sept. 7, 1948

2,448,536

UNITED STATES PATENT OFFICE 2,448,536

WHEEL COVER

George Albert Lyon, Allenhurst, N. J.

Application May 12, 1945, Serial No. 593,471

6 Claims. (Cl. 301—37)

1

This invention relates to a wheel cover and more particularly to a multipart cover for an automobile wheel.

An object of this invention is to provide a simple medium in a cover for taking up any play between the cover and the wheel and whereby the cover can have a tensioned tight engagement with at least one of the wheel parts.

Still another object of this invention is to provide an improved multipart wheel cover wherein simple means is provided for accommodating allowable manufacturing tolerances in the parts of a wheel.

Another object of this invention is to provide an improved type of retention for an automobile wheel cover.

In accordance with the general features of this invention, there is provided in a cover structure for a wheel including tire rim and body parts and cover retaining means, a wheel cover for the outer side of a wheel having an inner turned margin provided with a resilient pliable cushion and having an outer portion engageable with one of said wheel parts, the cushion upon engagement by the retaining means yielding until the outer portion of the cover tightly bears against the wheel in tensioned engagement therewith.

Another feature of the invention relates to the provision in the aforesaid structure of hub cap retaining means on the cover and a hub cap detachably engaged therewith for concealing the cover retaining means and the inner margin of the cover.

Figure 2:
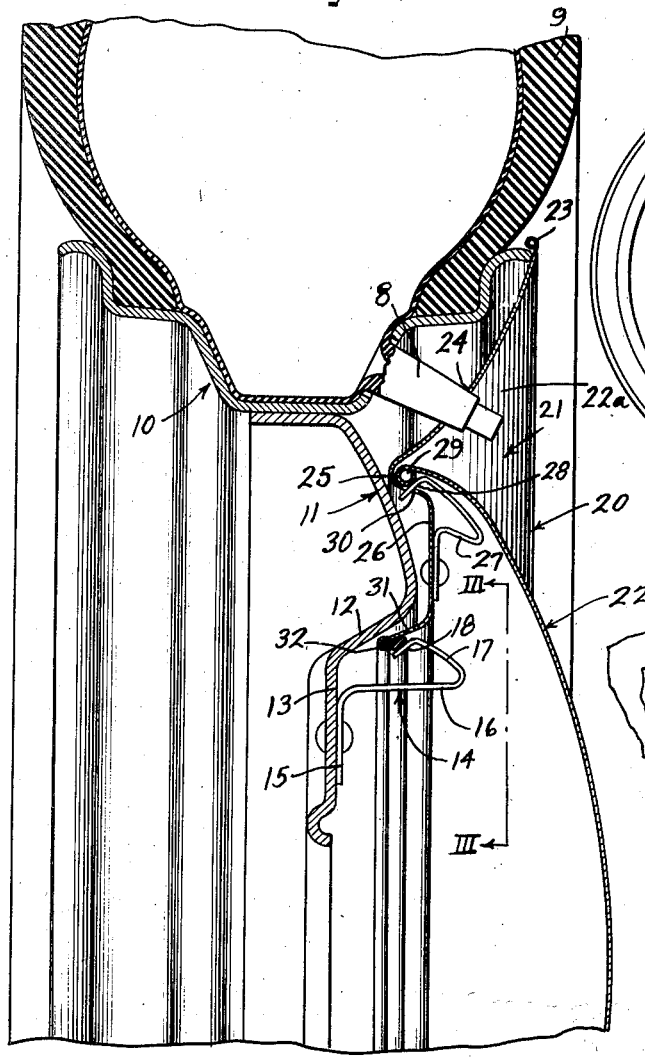
Figure 1:
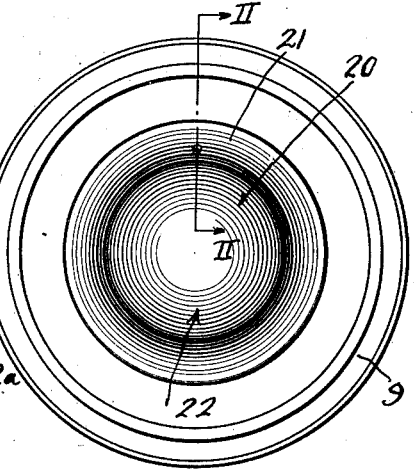
Figure 3:
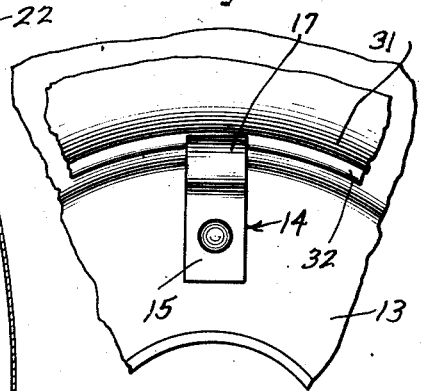

Other objects and features of this invention will more fully appear from the following detailed description taken in connection with the accompanying drawings, which illustrate a single embodiment therewith and in which Figure 1 is a side view of a wheel structure embodying the cover of my invention;

Figure 2 is an enlarged fragmentary cross-sectional view taken on substantially the line II—II of Figure 1 looking in the direction indicated by the arrows; and Figure 3 is a fragmentary detail view of the cover retaining means taken on substantially the line III—III of Figure 2 looking to left.

As shown in the drawings:

The reference character 9 designates generally a conventional automobile pneumatic tire and tube, which is carried in the usual way by a multi flanged drop center type of tire rim designated by the reference character 10. The tire and tube is provided with usual valve stem 8 which pro-

2 jects through one of the side flanges of the tire rim.

The tire rim is carried upon a load bearing or body part 11, which is in the form of a metallic stamping. The base flange of the rim may be secured in any conventional manner to the outer periphery of the body part 11. This body part includes a depressed central portion 12 terminating in a radially extending bolt-on flange 13 adapted to be secured by suitable cap screws, bolts or the like (not shown), to a part on an axle such for example, as a brake drum, as is well known in the art.

It is the aim of this invention to provide a novel cover for this wheel and which may be held on the wheel by the usual hub cap retaining springs designated by the reference character 14. Each of these springs 14 includes a leg 15 fastened to the base flange 13 of the body part and an axially extending leg 16, and a turned back portion 17 having an angular free extremity 18 over which the cover or hub cap, to be retained on the wheel, is adapted to be cammed. This type of spring clip is sometimes referred to in the art as an inverted type of spring clip and is now well known in the automobile industry.

The cover assembly of my invention is designated generally by the reference character 20 and includes an annular cover member 21 and a cooperable hub cap 22 detachably mounted on the annular cover member 21. The annular cover member 21 has an outer annular portion 22a which terminates at its periphery in a turned edge 23 adapted to overhang an outer edge of the tire rim adjacent the side wall of the tire 9. In addition, this portion 22a has an aperture 24 through which the valve stem 8 is adapted to extend so as to afford access to the valve stem without the necessity of removing the cover from the wheel.

The portion 22a extends radially and axially inwardly from the turned edge 23 to a turned portion 25, which, in turn, is connected to a flattened portion 26 extending substantially radially of the wheel. This flattened portion 26 has attached to it a plurality of hub cap retaining spring clips 27 which are also of the inverted type as in the case of the clips 14. Both the clips 14 and 27 may be of any suitable number sufficient to retain the cooperating cover parts on the wheel. I find that excellent results may be obtained by using either three or four of each of these clips arranged in a common circle.

The clip 27 has a turned free extremity 28 over which the turned edge 29 of the hub cap 22 is adapted to be cammed into retained engagement with the turned portion 25 of the cover member 21. A sufficient clearance is provided between the turned edge 29 and portion 22a to permit of the introduction of a pry-off tool under the turned edge for the purpose of prying the hub cap free of the clips 27 when it is desired to have access to the central portion of the wheel. The construction of the clips 27 is such that they permit of what is termed an "easy on and hard off" action insofar as the application and removal of the hub cap is concerned.

It should be noted that the cover member 21 is provided with a plurality of apertures 30 through which the free extremities 28 of the spring clips 27 are movable in the application of the hub cap to the member 21 as well as its removal therefrom.

The flattened portion 26 of the cover member 21 terminates in an inwardly turned marginal portion 31 which at its inner edge has suitably secured thereto a circular rubber bead 32 adapted to be engaged by the free extremities 18 of the spring clips 14. This annular rubber ring 32 may have a figure 8 cross section and may have one of its portions secured in a bead on the inner edge portion 31 of the cover member. The purpose of this cushioning bead is to yield so that the cover can accommodate manufacturing tolerances or variations in the wheel parts 10 and 11. In other words, the purpose of this cushion is to take up any play that is between the point of bearing of the cover portion 22a on the edge of the rim and the point of contact with the retaining means at the center of the wheel. This rubber cushion will yield until the outer edge 23 of the cover member 21 is tightly in engagement with the outer edge of the rim. This insures a tight fit of the cover and provides for a cushioned engagement which would tend to minimize rattle of the cover on the wheel.

When it is desired to remove the cover member 21 the hub cap 20 is first removed in the manner previously described and thereafter a pry off tool may be inserted under the edge 23 to forcibly eject the member 21 from its retained cooperation with the spring clips 14. It should be noted that the spring clips 14 function in much the same manner as the clips 27 in that they likewise permit of the so-called "easy on and hard off" action. In reality, the free extremities 18 of the spring clips 14 wedge the edge of the cover member 21 under tension toward the body part of the wheel.

Both the cover members 21 and 22 may be made of any suitable cheap material, such for example, as metallic sheet. The hub cap member 22, for example, may be made of stainless steel in which event it could be given a highly lustrous finish. The other member 21 could be made of ordinary sheet steel and suitably finished in color. A desirable color effect may be obtained by finishing the external surface of portion 22 in white in which event it will appear to constitute a white side wall part of the tire 9. The reason for this is because of the proximity of this portion to the side wall of the tire as well as its contour. That is to say, it has a cross-sectional configuration such that it appears to constitute a continuation of the side wall of the tire.

I claim as my invention:

1. In a cover structure for a wheel including tire rim and body parts and cover retaining means, a wheel cover for the outer side of the wheel having an inner turned margin provided with a resilient flexible cushion and having an outer portion engageable with one of said wheel parts, said cushion upon engagement by said retaining means yielding until said outer portion of the cover tightly bears against said wheel in tensioned engagement therewith.

2. In a cover structure for a wheel including tire rim and body parts and cover retaining means, a wheel cover for the outer side of the wheel having an inner turned margin provided with a resilient flexible cushion and having an outer portion engageable with one of said wheel parts, said cushion upon engagement by said retaining means yielding until said outer portion of the cover tightly bears against said wheel in tensioned engagement therewith, hub cap retaining means carried by said cover and a hub cap detachably engaged therewith and concealing said cover retaining means and the inner margin of said cover, an annular portion of the cover intermediate said margin and said outer portion being inwardly offset and affording a groove receptive of the hub cap edge, and said hub cap retaining means urging said hub cap edge into the groove.

3. In a cover for a wheel including a tire rim and a body part having cover retaining means, an annular cover having an outer portion for bearing against the tire rim and having an inner portion provided with a resiliently pliable cushion engageable by the cover retaining means to hold said outer portion in tensioned engagement with the tire rim and to retain the cover on the wheel.

4. In a cover for a wheel including a tire rim and a body part having cover retaining means, an annular cover having an outer portion for bearing against the tire rim and having an inner portion provided with a resiliently pliable cushion engageable by the cover retaining means to hold said outer portion in tensioned engagement with the tire rim and to retain the cover on the wheel, and a hub cap detachably held on said cover to conceal said retaining means and the cushioned inner portion of the cover, the outer portion of the cover being contoured to appear as a continuation of the side wall of a tire, and the hub cap directly meeting the inner boundary of said outer portion.

5. In a cover structure for a wheel including tire rim and body parts and cover retaining means, a wheel cover for the outer side of the wheel having an outer portion engageable with said tire rim part and an inner margin engageable with the body part and being constructed and arranged to remain free of the wheel parts throughout a substantial extent between said inner margin and the point of engagement with said tire rim part, and cushion means disposed for engagement by said cover retaining means radially outwardly from the point of engagement of said margin with the body part, said cushion being yieldable under the retaining engagement by said retaining means and pressing axially inwardly against the contiguous portion of the cover whereby to effect fulcruming of the cover about said point of engagement by said inner margin to drive the outer portion of the cover into tensioned bearing engagement with the tire rim.

6. In a cover for a wheel including a tire rim and a body part having cover retaining means, an annular cover member having a radially outer portion for bearing against the tire rim and having a radially inner portion provided with a resiliently pliable cushion engageable by the cover retaining means to hold said outer portion in tensioned engagement with the tire rim and to retain the cover on the wheel, and a hub cap detachably held on said cover member in concealing relation to said radially inner portion and said retaining means and the cushion.

GEORGE ALBERT LYON.

REFERENCES CITED

The following references are of record in the file of this patent:

UNITED STATES PATENTS

| Number | Name | Date |
|---|---|---|
| 2,157,908 | Lyon | May 9, 1939 |
| 2,166,216 | Lyon | July 18, 1939 |